United States Patent
Achenbach

(10) Patent No.: US 8,029,010 B2
(45) Date of Patent: Oct. 4, 2011

(54) SUSPENSION FORK

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 12/617,548

(22) Filed: Nov. 12, 2009

(65) Prior Publication Data

US 2010/0117321 A1    May 13, 2010

(30) Foreign Application Priority Data

Nov. 13, 2008   (DE) .................. 10 2008 057 269

(51) Int. Cl.
*B62K 21/02* (2006.01)
(52) U.S. Cl. .................. 280/276; 280/279; 188/175
(58) Field of Classification Search .................. 280/276, 280/279; 188/175
See application file for complete search history.

(56) References Cited

U.S. PATENT DOCUMENTS

| | | | |
|---|---|---|---|
| 4,971,180 A | 11/1990 | Kobayashi et al. | |
| 4,972,928 A | 11/1990 | Sirven | |
| 5,996,746 A | 12/1999 | Turner et al. | |
| 6,026,939 A * | 2/2000 | Girvin et al. | 188/266.7 |
| 6,120,049 A * | 9/2000 | Gonzalez et al. | 280/276 |
| 6,592,136 B2 * | 7/2003 | Becker et al. | 280/276 |
| 7,464,950 B2 * | 12/2008 | Schuman et al. | 280/279 |
| 7,506,884 B2 * | 3/2009 | Fox | 280/284 |
| 2009/0001684 A1 * | 1/2009 | McAndrews et al. | 280/276 |
| 2010/0117329 A1 * | 5/2010 | Achenbach et al. | 280/276 |

FOREIGN PATENT DOCUMENTS

| | | |
|---|---|---|
| DE | 10 2006 009 759 A1 | 9/2007 |
| DE | 10 2007 043 617 A1 | 4/2008 |
| EP | 1 006 046 A2 | 12/1999 |
| WO | WO 2008/079093 A1 | 7/2008 |

* cited by examiner

*Primary Examiner* — Paul N Dickson
*Assistant Examiner* — Marlon Arce
(74) *Attorney, Agent, or Firm* — Greer, Burns & Crain, Ltd.

(57) ABSTRACT

A suspension fork for a bicycle includes at least one stanchion tube and at least one slider tube interacting therewith and a wheel receiving space, and a damper system. The damper system includes a damper chamber divided into a first chamber and a second chamber by a movable piston and a damping device for rebound damping and a damping device for compression damping. The damper system is disposed at the stanchion tube, the damping device for rebound damping and the damping device for compression damping are disposed above the movable piston.

22 Claims, 9 Drawing Sheets

SUSPENSION FORK

BACKGROUND

The present invention relates to a suspension fork for a bicycle and a damper system for such a suspension fork.

Employing suspension forks in bicycles has basically been known for a long time. Suspension forks configured in particular as telescopic suspension forks are installed in downhill and mountain bikes and cross-country bikes, and increasingly in everyday bicycles as well.

Most suspension forks comprise a pair of tubes stationary relative to the bicycle frame, the so-called stanchion tubes, and two lower, movable tubes, the so-called slider tubes, to which the wheel hub is fastened. The stanchion tubes may be held together by means of a fork bridge or fork crown at the center of which the fork column is attached as a rule. Most slider tubes or outer tubes are larger in diameter so as to accommodate the stationary tubes to be slidingly displaceable in the slider tubes.

The riders of suspension fork-equipped bicycles desire suspension forks whose springing and damping characteristics can be easily and quickly adjusted to speedily adapt the current suspension fork characteristics to actual ambient conditions.

Therefore, suspension forks have become known in the prior art which are provided with adjusting elements. For example U.S. Pat. No. 6,592,136 B2 discloses a suspension fork having an oil chamber provided in a lower region of a slider tube and divided into two sections by way of a movable piston. The piston rod connected with the piston is attached to the top end of the stanchion tube and configured hollow to allow an adjusting mechanism to pass through to the piston. This is a complex structure, requiring very long, thin components to adjust the damping and controls of the damper system.

Another drawback of this structure is that in operation, considerable heat is generated at the damper valve for adjusting the rebound damping and at the damper valve for adjusting the compression damping which heat spreads in the slider tube by way of the heated oil, accumulating in the lower region. Furthermore, in this known prior art the rebound stage damper valve is disposed in the lower region of the slider tube such that the heat generated in the rebound stage during damping accumulates in the lower region of the slider tube. Compression stage damper valves tend to be provided at the lowermost end of a slider tube such that the heat it generates again accumulates at the bottom.

By way of the heated oil accumulating in the lower slider tube regions where the rebound stage damper valve is provided as well, the generated heat is emitted in the lower slider tube region so as to result in the slider tube heating up more than does the stanchion tube. In this way, different thermal expansions of the slider tubes and the stanchion tubes may result.

Against the background of the described prior art it is therefore the object of the present invention to provide a suspension fork allowing a simpler structure. It is a preferred aspect of the object to provide a suspension fork comprising improved heat dissipating options.

SUMMARY

The suspension fork according to the invention is provided to be used with a bicycle and comprises at least one stanchion tube and at least one slider tube interacting therewith and a wheel receiving space adjacent thereto. Furthermore, a damper system is provided comprising at least one damper chamber at and in particular inside a stanchion tube separated by way of a movable piston to form a first chamber and a second chamber. A damping device for rebound damping or rebound stage damping and a damping device for compression damping or compression stage damping are provided. Said damping device for rebound damping and said damping device for compression damping are disposed above the movable piston and in particular above or at the top end of the damper chamber.

The suspension fork according to the invention has many advantages. One considerable advantage of the suspension fork according to the invention is that the damping device for rebound damping and the damping device for compression damping are disposed above the movable piston. In this way, the heat dissipation which occurs in damping takes place in a region at the top of or above the damper chamber so as to allow efficient cooling. Since the damper system is provided at or even inside a stanchion tube connected to the frame of the bicycle, adjusting the damping characteristics may occur particularly easily via an adjusting element e.g. at the top of the suspension fork.

Differently from the prior art, long and very thin components are not required to adjust the springing and damping characteristics of the suspension fork according to the invention.

Since the damping devices for rebound and compression damping are provided above the damper chamber at and in particular inside the stanchion tube, several operating or adjusting elements can be used, even placed side by side, to adjust the desired suspension fork characteristics. The suspension fork according to the invention does not require several operating elements intertwined in a narrow and long tube of a piston rod.

The quantity and location of control elements may be adapted to specific requirements. Positioning is not restricted to a concentric layout relative to one another but particular components may be placed side by side.

One preferred aspect of the invention is to conduct the damping medium upwardly for damping where the heat dissipates. Furthermore, this allows for flexibility in positioning the adjusting elements in the top region.

In particular, the damping devices for rebound damping and compression damping are attached above the damper chamber.

At least one damping device may be configured as an adjustable damper valve. The damping device for rebound damping and/or the damping device for compression damping may be configured as an adjustable damper valve. Adjustments may be controlled manually or automatically.

Preferably, a pair of spaced-apart stanchion tubes and a pair of slider tubes interacting therewith, and at least one connector connecting the two stanchion tubes above the wheel receiving space are provided.

At this point, reference is made to that preferably the connector of the pair of spaced-apart stanchion tubes may be configured as a separate fork crown or else integrally with the stanchion tubes. Several connectors or fork crowns or the like may be provided as well.

According to a more specific embodiment of the invention, a control section is provided above the damper chamber at which there are located the damping device for rebound damping or the damper valve for adjusting the rebound damping, and the damping device for compression damping or the damper valve for adjusting the compression damping. The control section may for example be configured as a separate assembly which the damping devices or damper valves are provided at or mounted to. The control section may form the top end of the damper chamber or the damper chamber per se or be connected therewith.

The control section is in particular disposed in the vicinity of the upper end of a stanchion tube. Preferably, the upper end of the control section may form the top end of the stanchion tube such that the upper end of the control section protrudes from, or is accessible at, the fork crown.

In this way, particular ease of adjustment and a simple structure of the suspension fork according to the invention are achieved. In this configuration, the control section with the damping devices or adjustable damper valves for the adjustment of rebound damping and compression damping is located at the upper end of the stanchion tube, projecting upwardly from the stanchion tube or being accessible from above. This allows operating or adjusting the damper valves directly to adjust rebound damping and compression damping. The rider of such a suspension fork-equipped bicycle can do this while riding such that he does not need to stop as he may have to otherwise for adjusting the damping characteristics of the suspension fork. Operation may occur via a remote shifter located e.g. at the handlebar and communicating with the adjusting element or several adjusting elements via a control cable or the like.

At least one control or shut-off valve may be incorporated in or disposed at the top end of the damper chamber. If the valve or at least some of the valves is/are disposed at the top boundary of the damper chamber, this also offers the advantage of ensuring that in normal cases the valves are covered with the damping fluid. If apart from damping fluid, air would be drawn in as well, the damping fluid might foam thus losing its full power.

To reliably prevent foaming, a more specific embodiment provides for the damping medium to be completely separated from air. To this end a flexible partition wall is provided in particular above the damper chamber to seal the damping fluid entirely and leakproof against air or another compressible media and in particular gas. The flexible partition wall may be configured as a flexible hose and may consist e.g. of rubber or a rubber-like material. The flexible partition wall allows volume compensation in compressing and rebound since the volume of the piston rod needs to be displaced. Preferably the gas volume is exposed to a pressure of several bars of excess pressure.

The valves in the region of the upper damper chamber are connected with the top end of the stanchion tubes in particular via control pins or other control elements to allow easy adjustment of the damping characteristics.

Preferably, the movable piston is in particular fixedly connected with the associated slider tube via a piston rod.

Due to the adjusting options for the damping characteristics of the suspension fork at the control section above the damper chamber, the piston rod may be structured considerably simpler than is the case in the prior art. In the most basic case, the piston rod may be configured as a solid or hollow rod which provides a rigid connection between the piston and the slider tube.

A more specific embodiment of the invention provides for the characteristics of the damper valve for adjusting rebound damping and the damper valve for adjusting compression damping in operation are adjustable by way of adjusting elements.

There is preferably provided additionally to the damping devices and/or damper valves for the adjustment of rebound damping and compression damping, at least one high-speed damper valve for rebound damping and/or compression damping. The characteristics of such a high-speed damper valve are in particular fixedly set. A high-speed damper valve may for example be preloaded at a defined bias by means of a spring such as a coil spring. Now, when the applied pressure exceeds the spring force, the high-speed damper valve opens so as to allow adequate damping in the case of sudden, heavy impacts.

In addition to or instead of a high-speed damper valve a blow-off valve may be provided which opens in the case of sudden, particularly heavy loads or if the shut-off valve is closed to avoid excess pressure in the system which would cause destruction of the damper system.

At this point, reference is made to that the damper valves for the adjustment of compression and rebound damping are configured as low-speed damper valves which serve to control the damping characteristics in regular riding conditions to dampen bumps, small stones and shocks and the like.

In preferred embodiments, at least one lock-out valve is provided to activate or lock as required the rebound stage and/or the compression stage as required. To this end, an adjusting element or adjusting member is provided which is provided and can be adjusted in particular in the vicinity of the top end of the stanchion tube to selectively either release or lock the path through the lock-out valve.

A shut-off valve for the rebound stage is desirable for example with the cyclist riding up a steep hill or a steep incline and the suspension fork is to be compressed for the inclination angle of the rider or the bicycle to be reduced compared to the suspension fork on rebound. This enables the rider to move the overall center of gravity forward and reduces the feeling or the risk of a backwards roll-over. In this kind of situation it is desirable for the suspension fork to not rebound during operation until the maximal spring travel is reached. For such adjustment it is sensible and preferred to activate a shut-off valve.

In all of the configurations described above, the slider tube or slider tubes preferably consist at least in part of a fibrous composite material so as to reduce the weight. Preferably, at least one stanchion tube consists of metal at least in part so as to increase heat dissipation. Employing a configuration in which at least one stanchion tube consists of metal and at least one slider tube consists of a fibrous composite material advantageously allows efficient heat dissipation by the suspension fork according to the invention.

Such a configuration leads to another considerable advantage by means of heat dissipation occurring high up at the top. The stanchion tubes of a metal or a metallic alloy dissipate the generated heat at the top while the slider tubes of a fibrous composite material do not heat up at all or only slightly. In this way, the differences in the coefficients of thermal expansion due to different materials used for the stanchion tubes and the slider tubes are not relevant.

In other configurations, the slider tubes and/or the stanchion tubes may consist of magnesium or a magnesium alloy or another metallic alloy.

Preferably, the damper chamber forms an internal chamber that is enclosed by an external chamber at least in part.

The damper chamber is in particular configured as a high-pressure chamber and the control section comprises a low-pressure chamber into which the damping fluid passes through the damper valves. The damping fluid employed is preferably oil. Other fluids are conceivable as well.

In all of the configurations, it is preferred for the control section to be provided with a riser for the compression stage and a riser for the rebound stage which lead to the corresponding valve regions or the damper valves.

In specific cases, the low-pressure chamber encloses the riser for the compression stage and/or the riser for the rebound stage. In this way, it is achieved that the low-pressure chamber is positioned radially farther outwardly and in particular adjacent to, or being closed or confined by, the external wall of the stanchion tube. This allows particular efficiency in dissipating heat outwardly.

In all of the configurations the first chamber is preferably adjacent to the control section and the second chamber communicates with the first chamber through a return channel and the control section so as to form a damping medium circuit.

The return channel in particular forms the external chamber which preferably radially encloses the internal chamber. This means that the external chamber is in particular adjacent to the inner wall of the stanchion tube at least in sections. In a lower region of the second chamber, the internal chamber may be enclosed by a center tube which in turn is enclosed by the stanchion tube wall. The gap between the wall of the second chamber and the center tube forms the external chamber in this place so as to form a thermal insulation by way of an air-filled annular gap between the external chamber and the stanchion tube wall in the lower region of the second chamber. In this way, it is ensured that the heat present in the damping medium in the lower region of the stanchion tube does not at all or only minimally dissipate to the slider tube that encloses the stanchion tube.

If oil is employed as the damping fluid the external chamber forms an external oil chamber and the internal chamber, an internal oil chamber.

It is a considerable advantage of the suspension fork that the damping medium is located immediately adjacent to the stanchion tube wall. The heated damping medium contacts the wall and can thus dissipate the generated heat immediately to the exterior. Thus, the inside of the stanchion tube may serve as a contact surface for the damping medium at least in sections. A wall consisting of metal or incorporating metallic particles provides for high thermal conductivity so as to provide improved thermal dissipation. Dissipation of heat occurs from the damper chamber immediately to the stanchion tube. No heat-insulating components are present in the upper region.

The damper system according to the invention is provided to be employed with a suspension fork of a bicycle and is structured to be inserted into a stanchion tube of a suspension fork. The damper system comprises a damper chamber divided into a first chamber and a second chamber by means of a movable piston. Damping devices are provided for rebound damping and for compression damping. When installed as intended, the damper system comprises a control section above the damper chamber which is provided with at least one of the damping devices for rebound damping and at least one of the damping devices for compression damping. The external dimensions of the damper system are provided to be inserted into a stanchion tube of a suspension fork.

The damper system according to the invention also has many advantages. The damper system according to the invention allows to achieve simplicity in structure and simplicity in adjustment of the damping characteristics. Concurrently, simplicity of cooling is enabled since the heat generated in damping forms in the upper region of the damper system where it can easily dissipate to the exterior.

Preferably the damper system is employed with a suspension fork in right-side-up structure in which the stanchion tubes affixed in the fork bridge of the suspension fork plunge into the larger-diameter slider tubes. It may also be employed with other suspension forks.

In all the configurations and more specific embodiments the at least one slider tube is preferably provided to be in sliding contact with the corresponding stanchion tube of the suspension fork. Preferably the stanchion tube or stanchion tubes is/are supported in the slider tubes by means of slide bearings.

In all of the configurations the lower ends of the slider tubes are preferably provided with one dropout each which are in particular provided to receive a wheel.

BRIEF DESCRIPTION OF THE DRAWINGS

Further advantages and applications of the present invention ensue from the description of exemplary embodiments which will now be discussed with reference to the enclosed figures.

DETAILED DESCRIPTION

In FIGS. 1 to 13, a first embodiment of the suspension fork 1 according to the invention is illustrated in views some of which are highly schematic. For better clarity and to better explain the function, some parts and components have been omitted.

Figure 1:
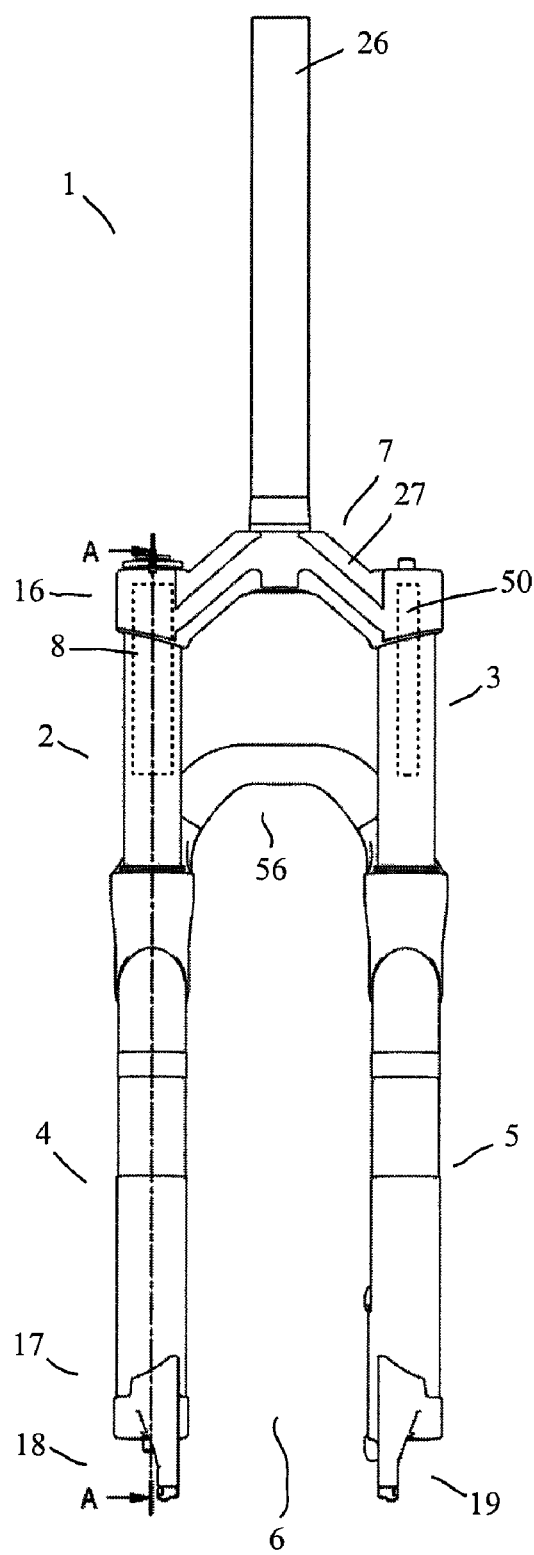
FIG. 1 is a front view of a suspension fork according to the invention.

The suspension fork 1 illustrated in FIG. 1 in a front view for a bicycle, presently not shown, comprises in its upper region a fork column 26 that is centrally attached to a connector 7 configured as a fork crown 27 to rotatably attach the fork to the bicycle frame.

The two ends of the fork crown 27 have stanchion tubes 2 and 3 affixed to the fork crown 27. A damper system 8 is disposed in the stanchion tube 2 and a suspension system 50 is provided in the stanchion tube 3. It is also conceivable to incorporate the damper system 8 and also the suspension system 50 in a stanchion tube 2 or 3. By means of the damper system 8 and the suspension system 50 the suspension fork 1 is provided with the desired springing and damping properties.

A slider tube unit is displaceably provided at the stanchion tubes 2 and 3, comprising slider tubes 4 and 5 connected with one another through at least one connecting bracket 56. The slider tube unit may consist of several component parts but it may as well be manufactured integrally.

The wheel receiving space 6 is provided between the pair of slider tubes 4 and 5 or between the stanchion tubes 2 and 3. A wheel, presently not shown, may be attached to the dropouts 18 and 19 of the slider tubes 4 and 5 at the lower end 17 of the suspension fork 1.

Figure 2:
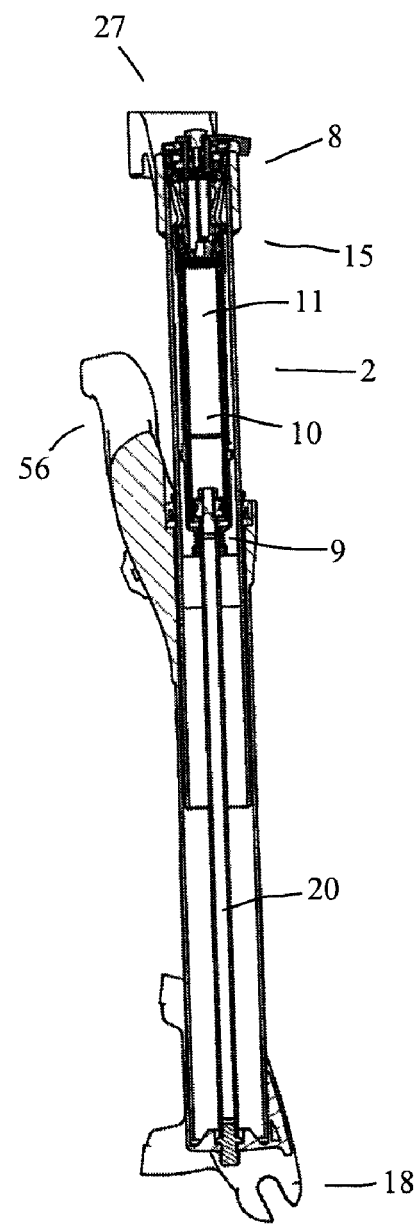
FIG. 2 is a cut side view along A-A of the suspension fork in FIG. 1.

At the upper end 16 a damper system 8 is incorporated in the stanchion tube 2, as can be taken in particular from FIG. 2.

The damper system 8 comprises a damper chamber 10 divided into an upper, first chamber 11 and a lower, second chamber 12 by means of a movable piston 9. Above the damper chamber 10 a control section 15 is provided which concurrently forms the top end of the damper chamber 10. The movable piston 9 is presently configured as a closed pump plunger. A flow through the movable piston 9 is not possible as a rule. When the piston is moved, external return flow must occur from the upper or first damper chamber 11 to the lower or second damper chamber 12.

While the damper chamber 10 with the first chamber 11 and the second chamber 12 is configured as a high pressure chamber 29, the control section 15 is provided with a low pressure chamber 32.

A damping device 57 for rebound damping and a damping device 58 for compression damping are provided in the control section 15. Presently the damping device 57 is provided as an adjustable damper valve 13 for adjusting the rebound stage damping and the damping device 58, as an adjustable damper valve 14 for adjusting the compression stage damping. Furthermore a shut-off valve 24 for the rebound stage, a shut-off valve 25 for the compression stage, and high-speed damper valves 22, 23 for the rebound stage and the compression stage and a blow-off valve 48 are provided.

At the upper end of the first chamber 11 of the damper chamber a check valve 51 is provided which by means of a spring not shown in any detail is preloaded in a closed position in which the check valve 51 closes the direct flow connection with the low pressure chamber 32. The check valve 51 opens as the first chamber has a relative negative pressure in the rebound stage (see FIG. 6).

A check valve 52 is provided which is preloaded in the closed position by means of a spring that is again not shown in detail. The check valve 52 opens as the second chamber 12 has a relative negative pressure in the compression stage (see FIG. 5) and the damping fluid is sucked from the low pressure chamber 32 through the return channel 35 and the external chamber 31 into the second chamber 12.

In the rebound stage the damping medium supplied to the riser 34 from the return channel 35 is introduced into the low pressure chamber 32 through the damper valve 13. In the case of the compression stage, the damping medium introduced into the duct riser 33 from the first chamber 11 is introduced into the low pressure chamber 32 through the damper valve 14. Then in the compression stage, the damping fluid enters from the first chamber 11, which forms part of the internal chamber 30, through the riser 33 into the control section 15. Depending on the position of the damper valve 14 for adjusting compression damping and after application of a load, the damping fluid is introduced through the damper valve 14 and/or through the high-speed damper valve 23 into the low pressure chamber 32.

In the case of the rebound stage, the damping fluid enters from the second chamber 12 in the lower region of the damper system 8 into the external chamber 31 which is configured as a high pressure chamber and which is confined in the lower region 36 of the second chamber 12 by the external wall of the stanchion tube 2 and by a center tube 37 which radially encloses the stanchion tube 2 in the lower region 36 of the second chamber 12. In this way a thermal insulation is achieved from the slider tube 4 which encloses the stanchion tube 2 in the lower region 36 of the second chamber 12 so as to largely prevent the slider tube 4 from heating in the lower region.

In relation to the loads occurring, the movable piston 9 slides upwardly and downwardly inside the damper chamber 10 wherein radially outwardly sealing against the internal chamber 30 occurs through a seal 49.

The damper valves 13 and 14 in the present embodiment are disposed displaceably via adjusting elements 21. The adjusting elements 21 may be configured as screw heads 28 wherein rotating the adjusting element 21 inserts the respective damper valve 13 or 14 further into the top end wall of the control section 15. In this way, slots or radial bores 54 and/or 55 through which the damping oil is directed in the compression stage or the rebound stage, are widened or narrowed. In this way, via rotational movement of the adjusting elements 21 of the damper valves 13 and 14, an efficient adjustment of the damping effect of the rebound stage and the compression stage is possible separate from one another. This adjustment of the damping effect in particular occurs for normal operation in which the suspension fork is adjusted for damping small to medium or else heavy impacts. To ensure damping including in the case of particularly heavy impacts, the high-speed damper valves 22 and 23 are provided for the rebound stage or the compression stage respectively. Although the high-speed damper valves 22 and 23 are as a rule not provided to be adjustable, this is possible as well.

In the present embodiment preloading devices are provided which are for example configured as coil springs so as to preload the respective high-speed damper valves 22 and 23 in the closed position. Now, as particularly large impacts occur the pressure in the damper chamber rises correspondingly such that the force of the respective preloading devices is overcome and the respective high-speed damper valve 22 or 23 opens. This will cause the valves to open in the case of sufficiently forceful loads.

Figure 3:
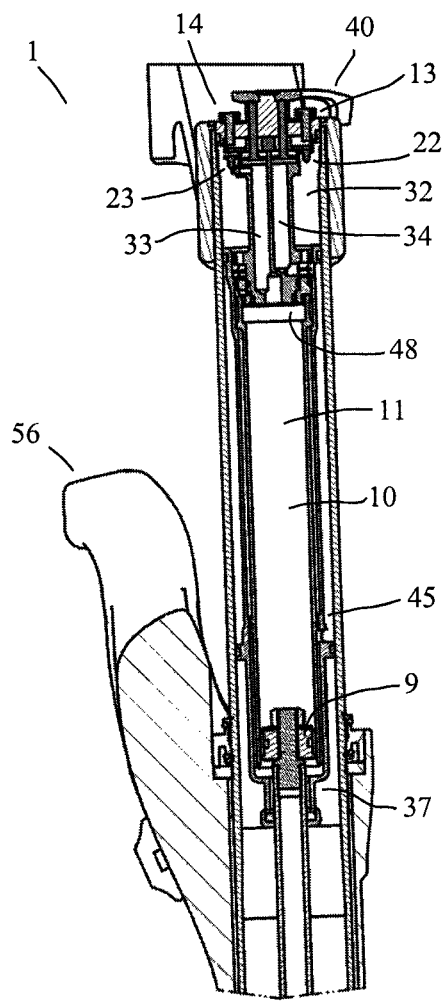
FIG. 3 is an enlarged, cut side view of the suspension fork in the compression stage.
Figure 4:
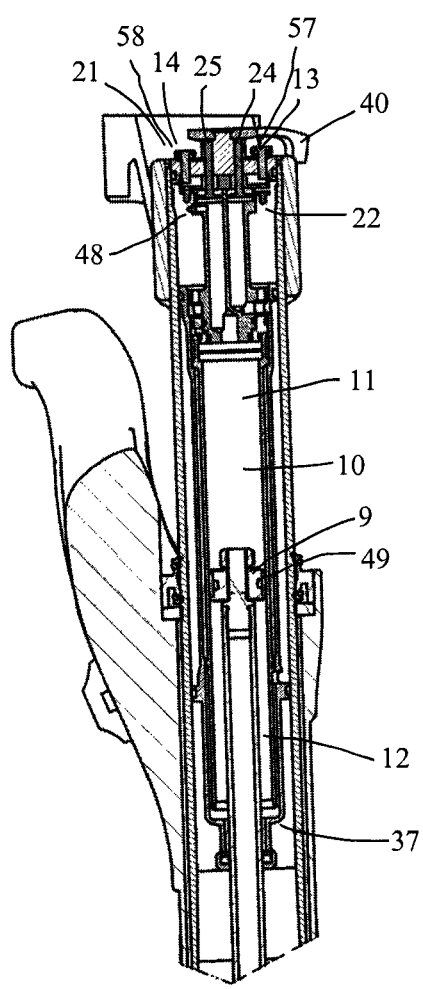
FIG. 4 is a cut side view of the suspension fork in the rebound stage.
Figure 5:
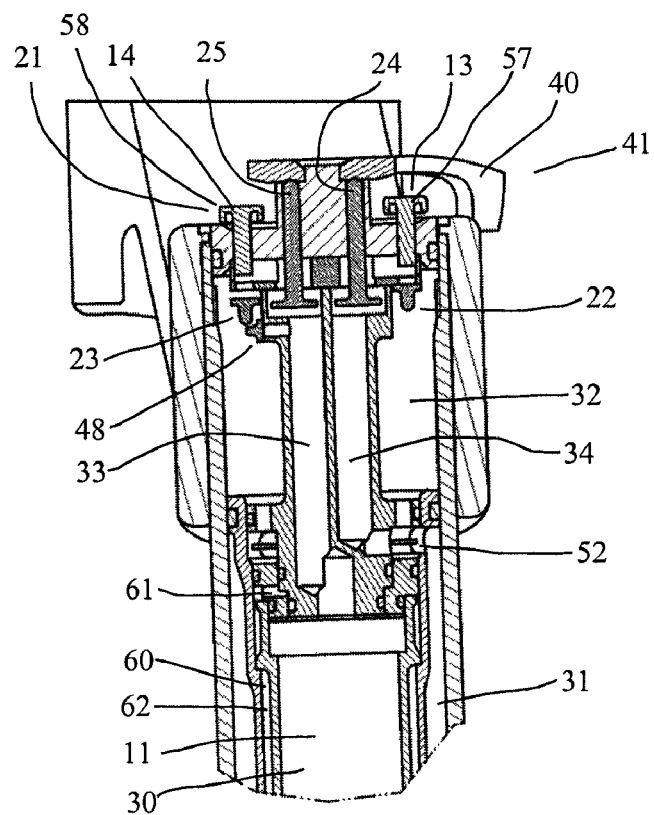
FIG. 5 is an enlarged view of the control section of the damper system of the suspension fork in FIG. 3 in the compression stage.
Figure 6:
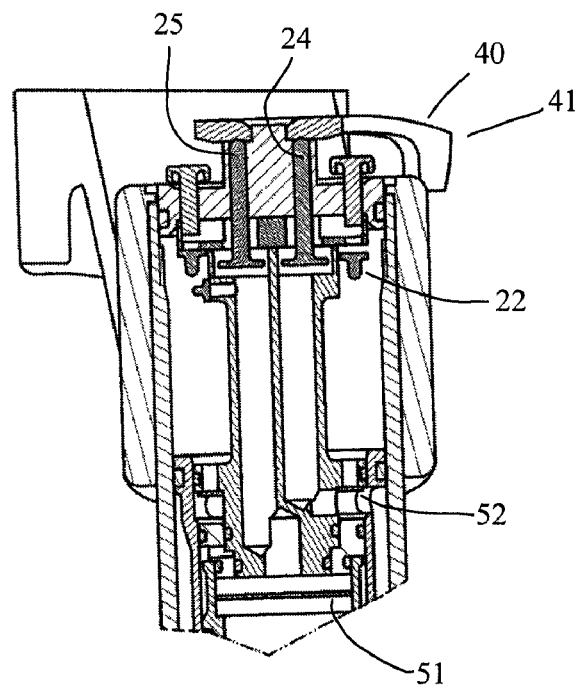
FIG. 6 is an enlarged view of the control section of the damper system of the suspension fork in FIG. 4 in the rebound stage.

FIG. 3 shows compressing in the compression stage while FIG. 5 shows the positions of each of the valves in enlarged illustration. FIG. 4 shows decompressing in the rebound stage while FIG. 6 shows enlarged illustrations of the valve positions.

It can clearly be seen in FIGS. 3 to 6 that both the shut-off valves 24 and 25 are open while the damper valves 13 and 14 are illustrated open or closed, depending on the operating condition.

As can in particular be taken from the illustration in FIG. 3, an overflow aperture 45 is located at the distance 46 from the lower end of the damper chamber 10 so as to allow the damping fluid to exit from the second chamber 12 even if the shut-off valve 24 for the rebound stage is closed until the piston 9 closes the overflow aperture 45, presently from above.

The shut-off valves 24 and 25 for the rebound stage and the compression stage serve to selectively prohibit damping in the rebound stage or in the compression stage. Damping may be prohibited by activating either of the valves such that the flow passage either for the rebound stage or the compression stage closes.

It is a considerable advantage of the illustrated embodiment that one single adjusting lever 40 is provided as the adjusting element 21 with which to intentionally and selectively jointly activate both the shut-off valve 24 of the rebound stage and the shut-off valve 25 of the compression stage.

To this end the adjusting lever 40 is pivotally disposed at the upper end 16 of the control section 15 such that the adjusting lever 40 presently projects from the upper end of the stanchion tube 2 and can be actuated by the rider as the operator while riding. All the rider needs to do is move one hand down to the fork crown 17 of the fork 1 and then by way of rotationally moving the adjusting lever 40 he can shift between presently three or even up to four shift stages provided. In a preferred configuration the adjusting lever 40 may be configured as a remotely controlled adjusting element actuated e.g. by a control mechanism at the handlebar.

In a first setting 41 of the adjusting lever 40 the situation illustrated in FIG. 5 is achieved in which both the shut-off valve 24 of the rebound stage and the shut-off valve 25 of the compression stage are not activated so as to allow free flow through the valves 24 and 25. This is the standard operating condition of the suspension fork 1 in which both a rebound damping and a compression damping and compression and decompression are possible.

Figure 7:
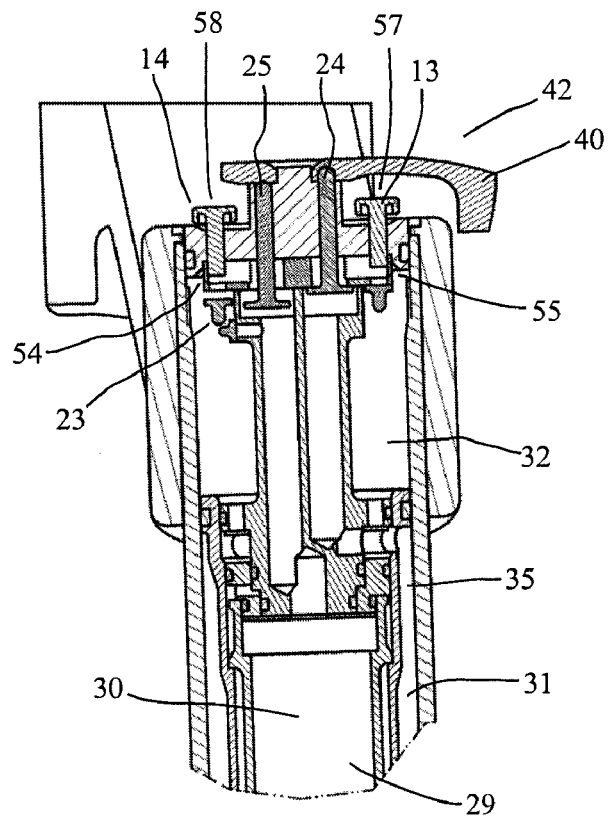
FIG. 7 is the control section of the damper system of the suspension fork in FIG. 1 with the adjusting lever in the first shift stage.

By way of rotational movement of the adjusting lever 40 from the position 41 to the second rotational position 42 as illustrated in FIG. 7, the shut-off valve 24 of the rebound stage is activated and thus closed such that in the rebound stage flow-through is substantially disabled. In the compression stage the shut-off valve 25 is still open. This means that compression is still possible while subsequent rebound is prohibited. Such a rotational position 42 of the adjusting lever 40 makes sense for example when the rider climbs a steep incline and wishes to reduce the inclination angle of the bicycle. By means of the front wheel fork compressing, its effective height decreases so that a safe and comfortable riding position is achieved. After activation of the pivot position 42 by the adjusting lever 40 being rotated, every impact and every compression causes the front wheel fork 1 to lower until a provided setting is reached.

Figure 8:
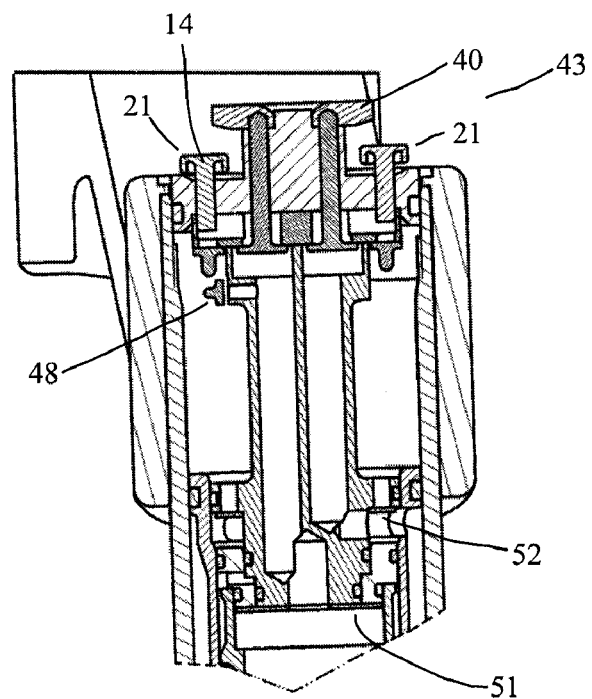
FIG. 8 is the control section of the damper system of the suspension fork in FIG. 1 with the adjusting lever in the second shift stage.

By way of rotating the adjusting lever 40 further into the third shift position 43 illustrated in FIG. 8 one achieves that not only the shut-off valve 24 for the rebound stage but also the shut-off valve 25 for the compression stage is closed. Adjusting the adjusting lever 40 in this way is possible at any time. In this way both decompression and compression of the fork is prohibited. The suspension fork 1 practically behaves as if no suspension and damper system were present. Only in the case of particularly heavy impacts the blow-off valve 48 can be activated, allowing flow-through so as to limit the maximum pressure occurring in the system and to prevent the damper system 10 of the suspension fork from being damaged or from breaking, for example if the rider jumps with his bicycle while the adjusting lever is in the third shift stage 43.

It may further be possible to shift the adjusting lever 40 to a fourth shift stage 44 in which the shut-off valve for the compression stage is closed while the shut-off valve 24 for the rebound stage is open. In this way decompression of the spring is allowed while compression is prohibited.

The suspension fork 1 furthermore comprises the overflow valve 45 indicated above which is provided at a distance 46 from the lower end of the first chamber 12. By means of the overflow aperture 45 the suspension fork 1 is prevented from compressing completely if the shut-off valve 24 of the rebound stage is activated.

A connecting duct 60 is provided in which at least one flow damper 63 is provided. The connecting duct 60 serves to allow the suspension fork to slowly, automatically rebound back to a specific measure when the shut-off valve 24 of the rebound stage is activated after heavy compressions.

To this end the connecting duct 60 provides a flow connection for the damping fluid between the second chamber 12 and the first chamber 11 as the stanchion tube 2 and the slider tube 4 cooperating therewith have compressed by more than a specified distance 46. In this way, in the case of forceful compression and with the shut-off valve 24 of the rebound stage activated, slow decompression is allowed up to a damper position 68 as defined by the predetermined distance 46.

Figure 9:
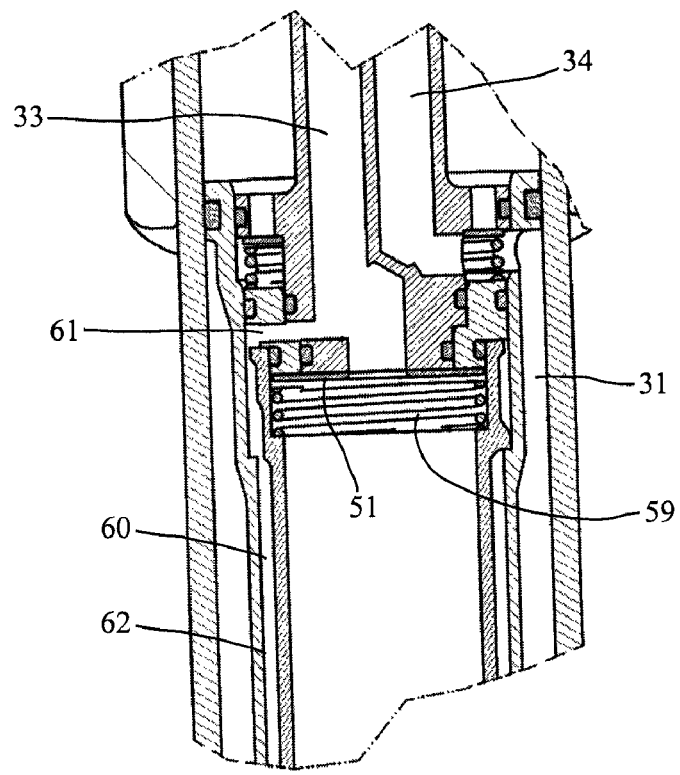
FIG. 9 is an enlarged cross-section of a stanchion tube in the upper region.
Figure 10:
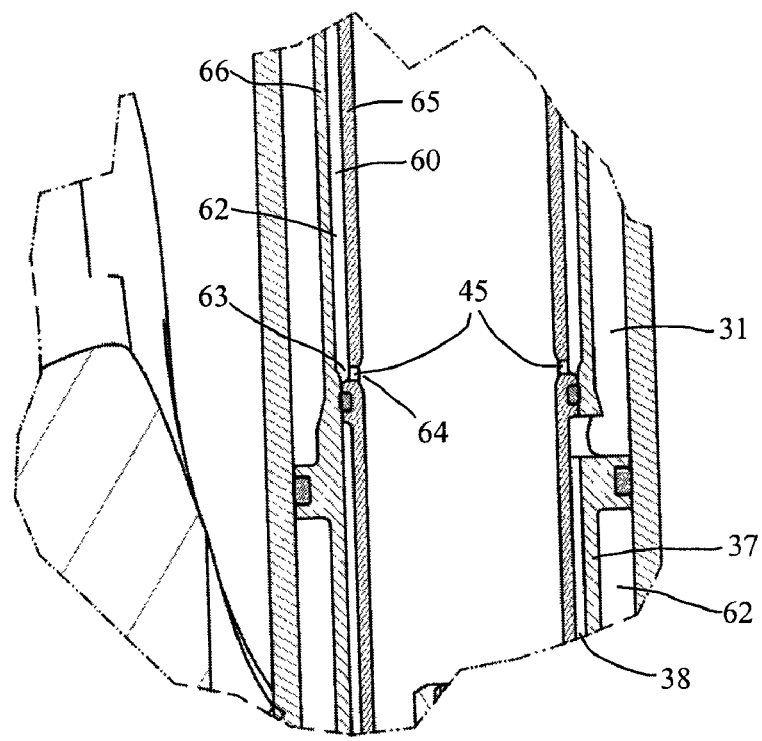
FIG. 10 is an enlarged cross-section of a stanchion tube in the region of the overflow aperture.

The configuration of the overflow valve or the overflow aperture 45 is illustrated enlarged in the FIGS. 9 and 10. In the range between approximately 20 and 50% of the compression travel at least one overflow aperture 45 is provided at the damper chamber 10. The overflow aperture 45 is located at the distance 46 from the bottom while the maximum stroke corresponds to the length 47. Presently the at least one overflow aperture 45 is connected with the aperture 61 via the duct formed as an annular duct 62 and presently opens into the riser 33. In this way damping fluid can immediately flow from the chamber 12 into the riser 33 and thus return into the chamber 11. The damping fluid can pass from the chamber 12 via the overflow aperture 45 into the duct 60 and further through the aperture 61 into the riser 33 and further into the first chamber 11 such that the suspension fork rebounds until the piston closes the overflow aperture 45 again.

The flow damper 63 is presently formed in particular by the overflow aperture 45 or by the overflow apertures 45, if several are present. The flow cross-section 64 of the flow damper 63 is formed by the clear passage area of the overflow aperture 45 (or by the sum of the areas of each of the overflow apertures 45). At any rate the flow cross-section 64 is presently substantially smaller than half the maximum flow cross-section of the damping device 58 or the damper valve 14 for the compression stage.

The ratio of the flow cross-section 64 of the flow damper 63 to the maximum flow cross-section of the damping device 58 for the compression stage is in particular smaller than 1:3 and preferably smaller than 1:5 and particularly preferably smaller than 1:8. Values of 1:10 or 1:20 and in particular 1:30 are conceivable and preferred. The area is in particular dimensioned such that the connecting duct 60 when open only slightly influences the damping reaction of the suspension fork.

The same preferably applies to the ratio of the flow cross-section 64 of the flow damper 63 to the maximum flow cross-section of the damping device 50 for the rebound stage.

The annular gap 62 is confined by an internal tube 65 and a center tube 66 both of which are positioned concentrically inside the stanchion tube.

In other configurations the connecting duct can be shut off e.g. via a controllable valve.

In other configurations the duct 60 may open immediately into the low pressure chamber 32 through an aperture 61 (variant not illustrated). Thus, a suspension fork can be adjusted to different operational modes. The suspension fork may be adjusted to be entirely rigid. The suspension fork may be compressed a specific amount e.g. for riding up-hill.

The function and mode of operation of the overflow valve 45 will now be explained with reference to FIGS. 11 to 13.

Figure 11:
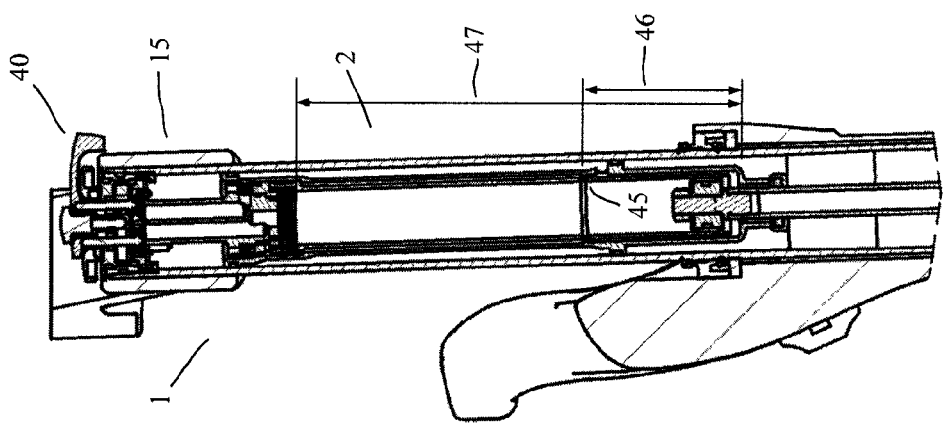
FIG. 11 is the suspension fork of FIG. 1 with the rebound stage locked in compressing.

In the illustration of FIG. 11 the suspension fork 1 is in the rebound state with the shut-off valve 24 of the rebound stage activated to allow the suspension fork 1 to compress while rebound is substantially prohibited.

After activating the shut-off valve 24 by displacing the adjusting lever 40 to the second shift stage 42 the riser 34 is closed for the rebound stage. The impacts occurring during the ride cause the suspension fork 1 to lower until the suspension fork has reached for example the position shown in FIG. 13 in which the piston 9 is compressed down to the overflow aperture 45.

Figure 12:
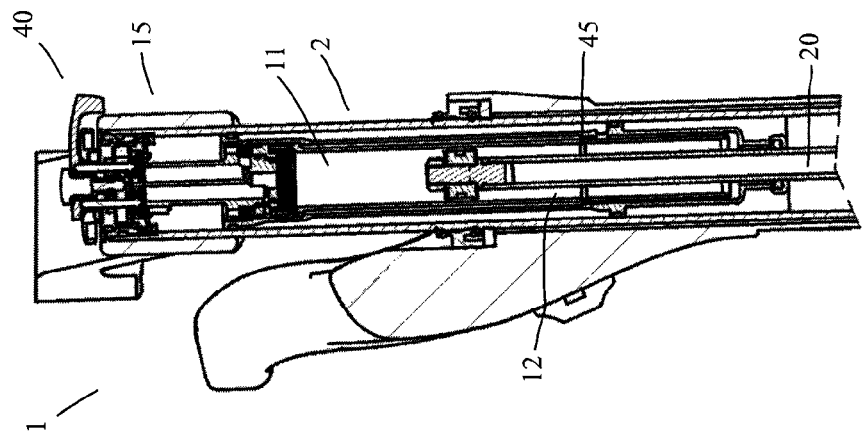
FIG. 12 is the suspension fork of FIG. 1 with the rebound stage locked after intense compression.

Now when another heavy impact acts on the suspension fork 1 in this position, the suspension fork is compressed further beyond the overflow aperture 45 (see FIG. 12). Thus the overflow aperture 45 is opened such that the locking action of the shut-off valve 24 is bypassed. The connecting duct 60 connects the second chamber 12 with the first chamber 11 and the suspension fork is automatically slowly lowered. The exchange of the damping fluid occurs slowly because the flow cross-section 64 of the overflow aperture 45 serving as the flow damper 63 is small.

Figure 13:
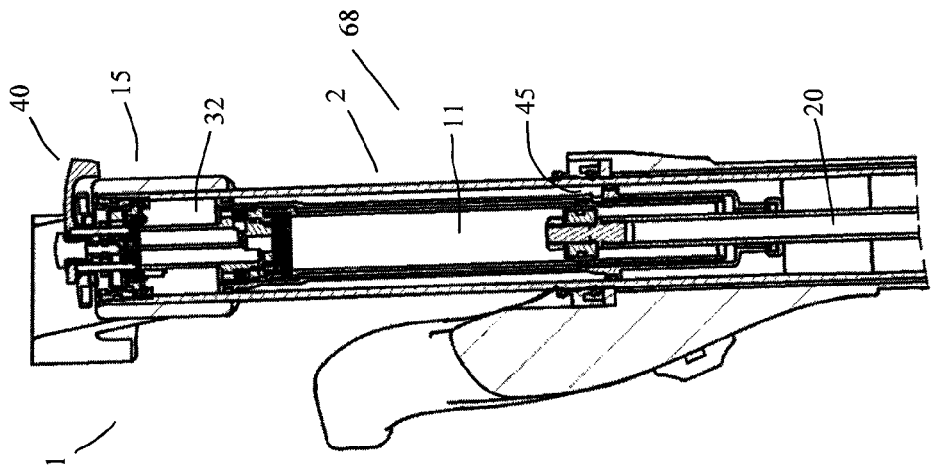
FIG. 13 is the suspension fork of FIG. 1 with the rebound stage locked and subsequent slow decompression.

Owing to the overflow aperture 45 the suspension fork 1 can rebound back until the condition shown in FIG. 13 is achieved in which the overflow aperture 45 is closed again.

On the whole a system is provided by means of the overflow aperture 45, the activated shut-off valve 24 notwithstanding so as to limit the suspension travel even if the shut-off valve 24 of the rebound stage is activated. By way of disposing the overflow aperture 45 the desired suspension travel can be adjusted.

In this way a function is provided which in up-hill rides provides the required compression while on the other hand a small damping function continues to be available.

With several adjustable or shiftable overflow apertures 45 provided at different heights, the suspension travel still available with the shut-off valve 24 activated can be adjusted correspondingly.

Figure 14:
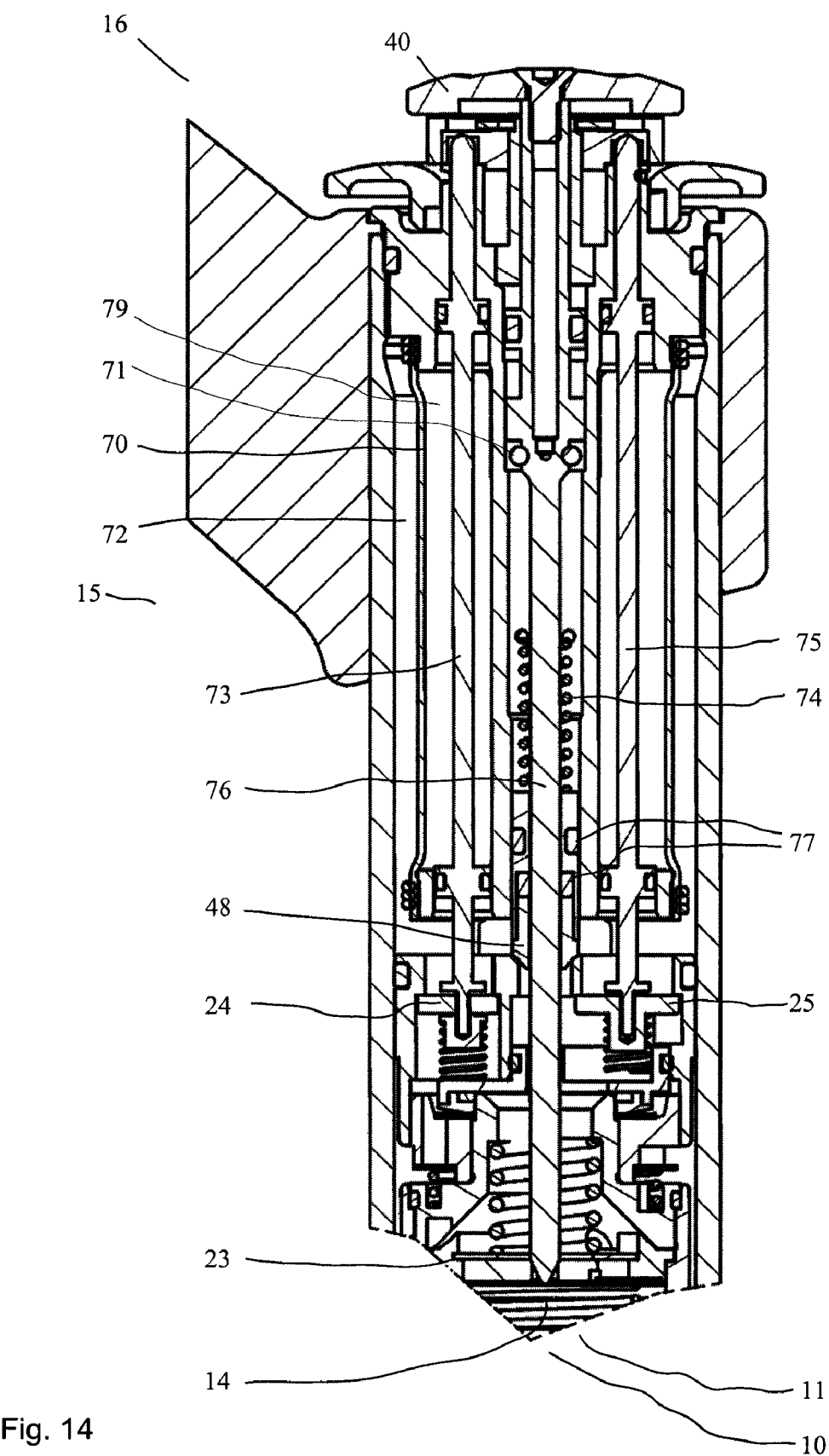
FIG. 14 is an enlarged illustration of a cross-section of the control section of another suspension fork.
Figure 15:
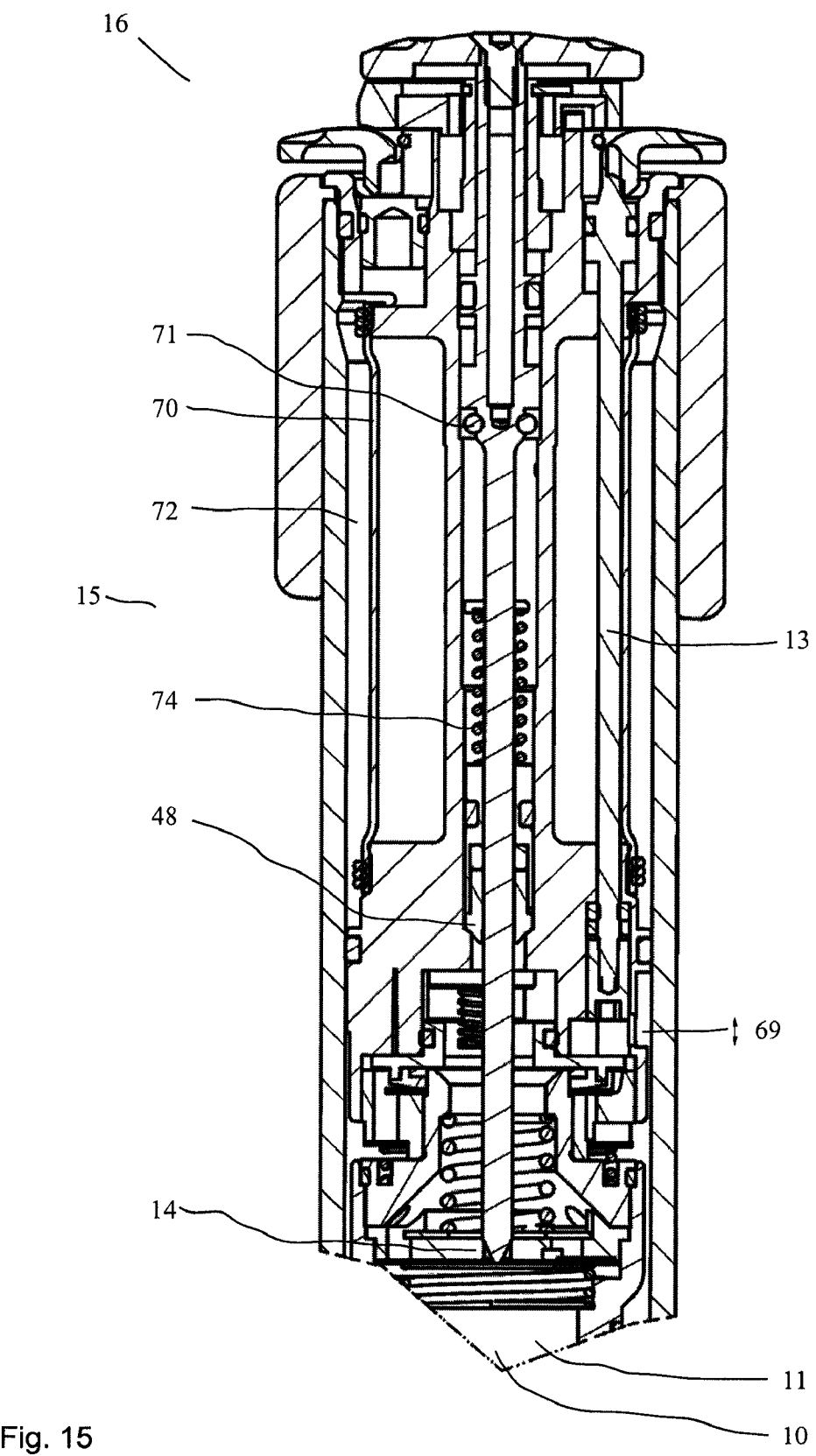
FIG. 15 is another cross-section of the control section of the suspension fork according to FIG. 14.
Figure 16:
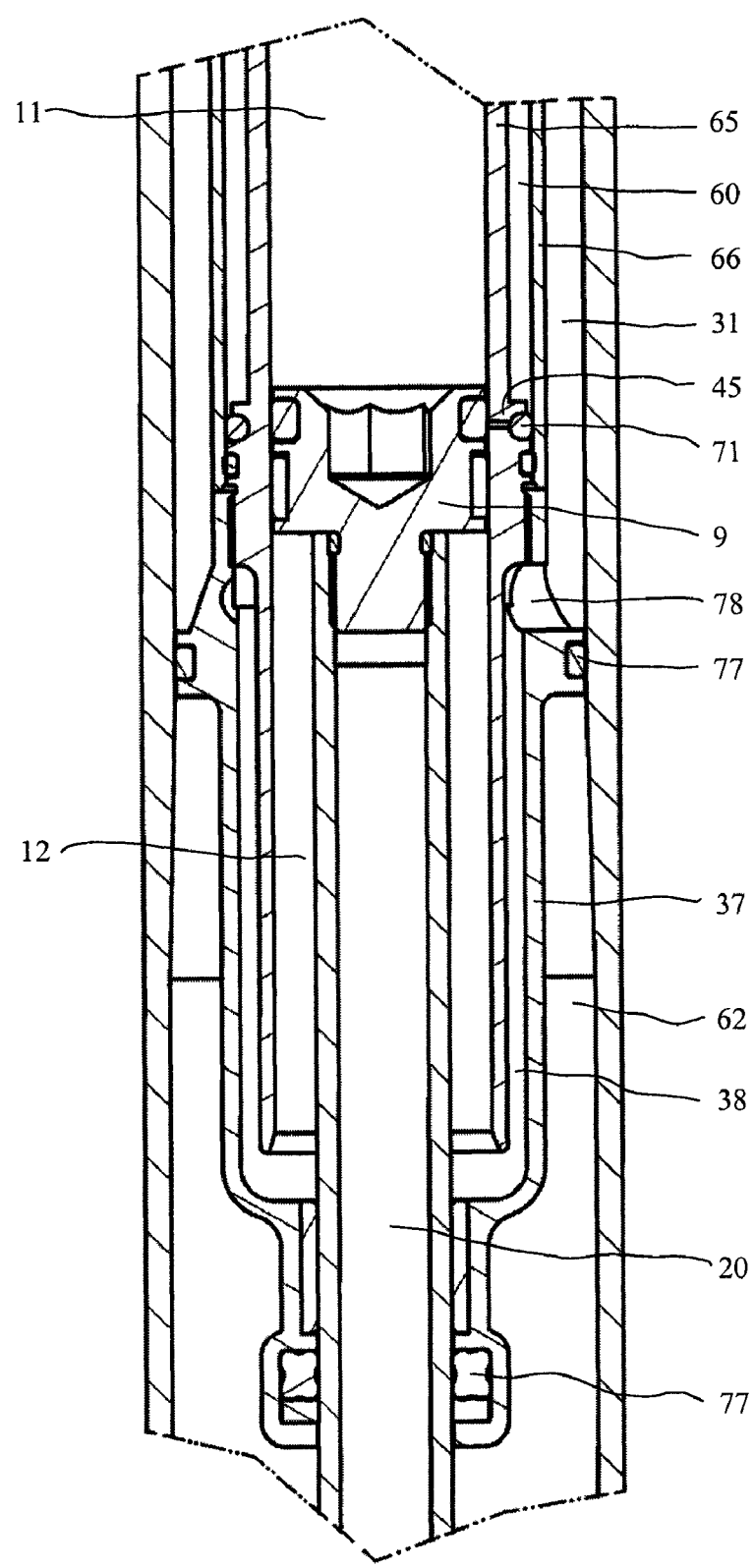
FIG. 16 is an enlarged cross-section of the suspension fork according to FIG. 14 with the movable piston.

The FIGS. 14 to 16 show cross-sections of another embodiment of a suspension fork 1 according to the invention. Like or similar parts are provided with the same reference numerals. The damper system 8 in turn is inserted in a stanchion tube 2 or 3 of a suspension fork 1, as shown in FIG. 1.

Unlike the preceding embodiment the embodiment according to FIGS. 14 to 16 provides for the damper valve 13 to be a low-speed damper valve for the rebound stage at the top end of the damper chamber 10. The damper valve 14 as a low-speed damper valve for the compression stage is likewise disposed at the top end of the damper chamber 10. The valves separate the high pressure region from the low pressure region. The control section 15 virtually extends from the upper end of the first chamber 11 to the upper end 16 of the stanchion tube 2.

The damper valves 13 (low-speed) for the rebound stage and 14 (low-speed) for the compression stage are connected with the upper end 16 through corresponding control elements or control pins and they are adjustable by way of actuating the adjusting element 40.

In FIG. 14 it can be seen that the control pin 73 acts on the shut-off valve 24 for the rebound stage such that lockout may be activated as needed and rebound damping may be locked. A control pin 75 acts on the shut-off valve 25 for the compression stage and it may selectively lock compression damping. In the case of particularly forceful shocks the blow-off valve 48 opens if the shocks generate a force exceeding the interior force of the spring 74 of the blow-off valve 48.

The blow-off valve 48 is sealed by means of seals 77 both relative to the control pin 76 and to the external wall.

The high-speed damper valve 23 is presently connected in parallel to the low-speed damper valve 14.

Above the shut-off valves 24 and 25 the oil compensation chamber 72 is separated from a gas volume 79 by means of a partition wall. The partition wall is presently configured as a rubber hose 70, ensuring reliable separation of the oil from the gas volume. The gas volume 79 is under excess pressure of typically between 1 and 5 bar. The movable piston 9 is presently configured as an impermeable pump plunger. When the movable piston 9 plunges, the volume available to the oil is reduced. In this way the gas volume 79 compresses by means of the flexible rubber hose 70 and the compensation chamber 72 expands correspondingly.

The O-ring 71 covers a bore. The O-ring 71 together with the bore serves as a one-way valve and serves for filling up the suspension fork with gas after mounting. The one-way valve opens as the internal pressure expands the O-ring far enough for gas to exit through the gap generated.

FIG. 15 shows another cross-section of the control section 15 wherein FIG. 15 shows a cross-section approximately transverse to the cross-section according to FIG. 14.

One can see the damper valve 13 as a low-speed control valve for the rebound stage. By way of longitudinal adjustment the regulating gap 69 is regulated and thus the flow resistance is adjusted.

FIG. 16 shows a cross-section of the region of the piston in the lower region of the damper chamber, where as in the preceding embodiment the overflow aperture 45 is provided.

The piston rod 20 is sealed by way of a seal 77 against the damper chamber 10. At the upper end of the piston rod 20 the movable piston 9 is provided that is configured as a pump plunger and that separates the first chamber 11 from the second chamber 12.

At its bottom the second chamber 12 makes a transition to the interspace 38 connected therewith. The second chamber 12 or the low-pressure region is limited externally by the center tube 37 that is sealed externally by means of a seal 77 towards the stanchion tube. At its upper end the interspace 38 is radially outwardly connected with the external chamber 31 through at least one aperture 78. The second chamber 12 together with the interspace 38 and the external chamber form the rebound stage chamber.

Positioned radially within the external chamber 31 the center tube 66 is provided in which the inner tube 65 is positioned concentrically. Between the inner tube 65 and the center tube 66 a duct 60 is provided. From the duct 60 an aperture 61 opens into the first chamber 11 in an upper region and an aperture 45 into the damper chamber 10, in a lower region. In this way the duct 60 acts as a bypass between the first chamber 11 and the second chamber 12 when the movable piston 9 is located between the apertures 45 and 61. In this way compensation is possible even in the case of a locked damping. Compensation occurs slowly since the flow cross-sections of the apertures are intentionally small.

To still further reduce the flow-through quantities through the overflow apertures 45 and 61, O-rings 71 may be provided across the overflow apertures 45 and 61. In this way it is achieved that a specific pressure must first be overcome which further slows down the flow and thus inhibits normal function as little as possible. It has been shown that the overflow apertures 45 and 61 ought to be very small. And even in the case of small apertures it makes sense to further reduce flow-through.

Another considerable advantage of the overflow apertures 45 and 61 and the bypass thus provided is that independently of the weight of the rider the same position will always be adjusted even in the case of a locked rebound stage. This position is independent of the acting forces and it is defined by the position of the bore. This is very advantageous since in this way the same position is set for every rider which is very advantageous in particular in steep uphill rides.

The function will now be described briefly: In the compression stage, i.e. during compression and with the shut-off valves 24 and 25 opened.

Following a shock, the movable piston 9 configured as a pump plunger moves upwardly and the pressure in the first chamber 11 above the piston 9 increases. Then the oil will flow upwardly through the damper valve 14 (compression stage valve low-speed).

The damper valve 23 is preloaded by a spring such that in the case of small loads a shim seals the damper valve 23. From a specific load or from a corresponding excess pressure onwards the high-speed damper valve 23 of the compression stage opens additionally such that the damper valves 14 and 23 are opened in parallel. The oil flows upwardly into the oil compensation chamber 72 at the upper end of the stanchion tube. The oil compensation chamber 72 configured as an annular chamber is formed between the stanchion tube wall and the flexible rubber hose 70. The rubber hose 70 compresses by way of the oil flowing into the oil compensation chamber 72. In the interior of the rubber hose 70 a gas volume 79 is present. The gas volume 79 is presently filled with air and in the present case under a pressure of e.g. 3-4 bar. In this way any cavitation in the flowing oil is avoided. By way of the rubber hose and the gas volume the volume of the piston rod is compensated. And, for thermal expansion of the oil a suitable reservoir is provided.

During compressing the pressure concurrently decreases in the second chamber 12 below the movable piston 9. At its bottom the second chamber is in flow connection with the interspace 38 and the external chamber 31, from where oil is now drawn. The external chamber 31 abuts the control section 15. A return flow valve opens there and oil flows out of the oil compensation chamber 72 from above.

In rebounding in the rebound stage the movable piston 9 moves downwardly and excess pressure forms in the lower, second chamber 12 and thus also in the external chamber 31 while negative pressure forms in the first chamber 11 above the piston 9.

By way of the negative pressure in the first chamber 11 at least one check valve positioned at the upper end opens, and oil is drawn from above from the oil compensation chamber 72.

On the whole the suspension fork 1 according to the invention provides a system which allows high heat dissipation in the upper region of the stanchion tubes 2, 3 wherein all the operating elements 21, 40 can be flexibly arranged in an upper region 16 of the stanchion tubes 2 and 3.

In all the embodiments at least one shut-off valve 24 or 25 and/or at least one damper valve 13 or 14 may be actuated or activated electrically or magnetically. A remotely controlled construction is in particular possible and preferred. Operating is e.g. possible from the handlebar. A mechanical remote control is also preferred.

Furthermore the damper valves 13, 14, 22-25 are also located in the upper region 16 of the stanchion tubes 2 or 3 and via a shared adjusting lever 40 provided at the fork crown 27 or at the stanchion tube 2, 3, both a rebound stage lockout (locked rebound stage shut-off valve) and a compression stage lockout (locked compression stage shut-off valve) may be set such that the fork 1 is rigid both in the compressing direction and in the decompressing direction. At the same time a damping function can be ensured via an overflow valve 45 even with the rebound stage lockout activated.

The invention claimed is:

1. A suspension fork for a bicycle, comprising:
   at least one stanchion tube and at least one slider tube interacting therewith and a wheel receiving space adjacent thereto and a damper system, wherein the damper system includes at least one damper chamber divided into a first chamber and a second chamber by means of a movable piston and a damping device for rebound damping and a damping device for compression damping, wherein the damper system is disposed at the stanchion tube, and the damping device for rebound damping and the damping device for compression damping are disposed above the movable piston; and
   a control section positioned above the at least one damper chamber, said damping device for rebound damping and said damping device for compression damping being disposed in said control section, wherein the control section is adjacent to the first chamber,
   said second chamber being connected with the first chamber through a return channel and the control section, wherein the return channel forms the external chamber.

2. The suspension fork according to claim 1, wherein the control section is disposed in the vicinity of the upper end of the stanchion tube.

3. The suspension fork according to claim 1, wherein the movable piston is connected with a slider tube via a piston rod.

4. The suspension fork according to claim 1, wherein two stanchion tubes spaced-apart from one another and a connector connecting the two stanchion tubes above the wheel receiving space are provided.

5. The suspension fork according to claim 1, wherein the damping device for rebound damping is configured as an adjustable damper valve.

6. The suspension fork according to claim 1, wherein the damping device for compression damping is configured as an adjustable damper valve.

7. The suspension fork according to claim 1, wherein at least one of a characteristic of the damper valve for adjusting rebound damping and a characteristic of the damper valve for adjusting compression damping are each adjustable in operation through adjusting elements.

8. The suspension fork according to claim 1, wherein additionally at least one high-speed damper valve for rebound damping and/or compression damping is provided whose characteristic is in particular fixedly set.

9. The suspension fork according to claim 1, wherein at least one shut-off valve is provided which is adjustable in particular via an adjusting element in the vicinity of the upper end of the stanchion tube.

10. The suspension fork according to claim 1, wherein adjusting elements are disposed in the vicinity of the upper end of the stanchion tube.

11. The suspension fork according to claim 1, wherein the slider tube consists of a fibrous composite material at least in part.

12. The suspension fork according to claim 1, wherein the stanchion tube consists of a metal at least in part.

13. The suspension fork according to claim 1, wherein the damper chamber forms an internal chamber which is enclosed by an external chamber at least in part.

14. The suspension fork according to claim 1, wherein the damper chamber is configured as a high pressure chamber and wherein the control section comprises a low pressure chamber.

15. The suspension fork according to claim 1, wherein the control section is provided with a riser for the compression stage and a riser for the rebound stage.

16. The suspension fork according to claim 14, wherein the low pressure chamber encloses risers for the compression stage and the rebound stage.

17. The suspension fork according to claim 13, wherein in a lower region of the second chamber the internal chamber is enclosed by a center tube wherein the gap between the wall of the second chamber and the center tube forms the external chamber.

18. The suspension fork according to claim 1, wherein the inside of the stanchion tube is a contact surface for a damping medium at least in sections.

19. A suspension fork for a bicycle, comprising:
at least one stanchion tube and at least one slider tube interacting therewith and a wheel receiving space adjacent thereto;
a damper system wherein the damper system includes at least one damper chamber divided into a first chamber and a second chamber by means of a movable piston and a damping device for rebound damping and a damping device for compression damping, wherein the damper system is disposed at the stanchion tube, and the damping device for rebound damping and the damping device for compression damping are disposed above the movable piston; and
a control section positioned above the at least one damper chamber, said damping device for rebound damping and said damping device for compression damping being disposed in said control section, wherein the control section is adjacent to the first chamber, and wherein the damper chamber is configured as a high pressure chamber and the control section includes a low pressure chamber.

20. A suspension fork for a bicycle, comprising:
at least one stanchion tube and at least one slider tube interacting therewith and a wheel receiving space adjacent thereto;
a damper system wherein the damper system includes at least one damper chamber divided into a first chamber and a second chamber by means of a movable piston and a damping device for rebound damping and a damping device for compression damping, wherein the damper system is disposed at the stanchion tube, and the damping device for rebound damping and the damping device for compression damping are disposed above the movable piston; and
a control section positioned above the at least one damper chamber, said damping device for rebound damping and said damping device for compression damping being disposed in said control section, wherein the control section is adjacent to the first chamber and is provided with a riser for the compression stage and a riser for the rebound stage.

21. A suspension fork for a bicycle, comprising:
at least one stanchion tube and at least one slider tube interacting therewith and a wheel receiving space adjacent thereto; and
a damper system wherein the damper system includes at least one damper chamber divided into a first chamber and a second chamber by means of a movable piston and a damping device for rebound damping and a damping device for compression damping, wherein the damper system is disposed at the stanchion tube, and the damping device for rebound damping and the damping device for compression damping are disposed above the movable piston, and wherein said at least one damper chamber forms an internal chamber that is enclosed by an external chamber at least in part, said second chamber being connected with the first chamber through a return channel and the control section, wherein the return channel forms the external chamber.

22. A suspension fork for a bicycle, comprising:
at least one stanchion tube and at least one slider tube interacting therewith and a wheel receiving space adjacent thereto; and
a damper system wherein the damper system includes at least one damper chamber divided into a first chamber and a second chamber by means of a movable piston and a damping device for rebound damping and a damping device for compression damping, wherein the damper system is disposed at the stanchion tube, and the damping device for rebound damping and the damping device for compression damping are disposed above the movable piston, and wherein said at least one damper chamber forms an internal chamber that is enclosed by an external chamber at least in part,
wherein in a lower region of the second chamber the internal chamber is enclosed by a center tube wherein a gap between the wall of the second chamber and the center tube forms the external chamber.

* * * * *